(12) United States Patent
Dou

(10) Patent No.: US 6,560,037 B2
(45) Date of Patent: May 6, 2003

(54) IMAGE PICKUP LENS SYSTEM

(75) Inventor: Satoshi Dou, 572-123, Shimonitta, Tsurugashima-shi, Saitama 350-2222 (JP)

(73) Assignees: Milestone Co., Ltd., Tokyo (JP); Satoshi Dou, Saitama (JP)

( * ) Notice: Subject to any disclaimer, the term of this patent is extended or adjusted under 35 U.S.C. 154(b) by 75 days.

(21) Appl. No.: 09/921,743

(22) Filed: Aug. 3, 2001

(65) Prior Publication Data

US 2003/0002174 A1 Jan. 2, 2003

(30) Foreign Application Priority Data

Jun. 18, 2001 (JP) ........................................ 2001-183117

(51) Int. Cl.$^7$ ................. G02B 3/02; G11B 7/00
(52) U.S. Cl. .................. 359/719; 359/718; 369/112.23
(58) Field of Search ................................ 359/718, 719; 369/112.23

(56) References Cited

U.S. PATENT DOCUMENTS 4,863,248 A * 9/1989 Saka ........................... 359/719
5,371,632 A * 12/1994 Naiki et al. .................. 359/719

* cited by examiner

*Primary Examiner*—Georgia Epps
*Assistant Examiner*—David N. Spector
(74) *Attorney, Agent, or Firm*—Koda & Androlia

(57) ABSTRACT

An image pickup lens system includes, in sequence from an object side to an image side, an aperture stop, a plano-convex lens having positive power and oriented such that a planar surface of the plano-convex lens faces the object side and a convex surface of the plano-convex lens faces the image side, the convex surface being aspheric, and another stop.

8 Claims, 5 Drawing Sheets

CONFIGURATION

OBJECT SIDE        IMAGE SIDE

CONFIGURATION

FIRST EMBODIMENT

SECOND EMBODIMENT

⇦ OBJECT SIDE                    IMAGE SIDE ⇨

THIRD EMBODIMENT

⇦ OBJECT SIDE                    IMAGE SIDE ⇨

FIRST EMBODIMENT
FIG. 5A
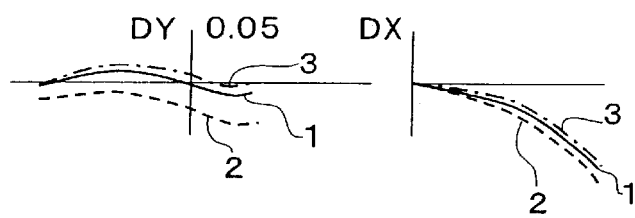
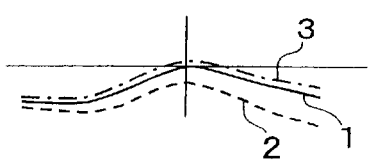
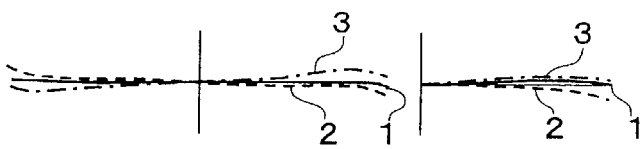
COMA ABERRATION
FIG. 5B
CHROMATIC AND SPHERICAL ABERRATIONS
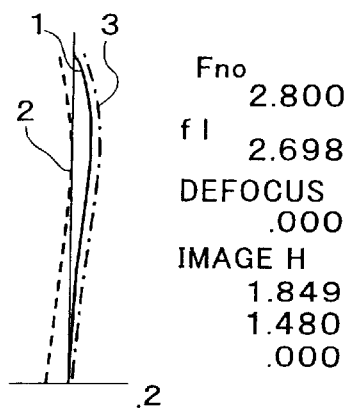
Fno 2.800
fl 2.698
DEFOCUS .000
IMAGE H
1.849
1.480
.000
FIG. 5C  FIG. 5D
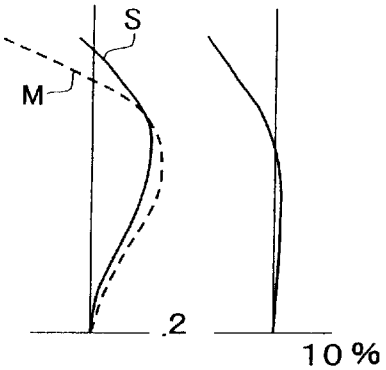
ASTIGMATISM   DISTORTION ABERRATION SECOND EMBODIMENT
FIG. 6A
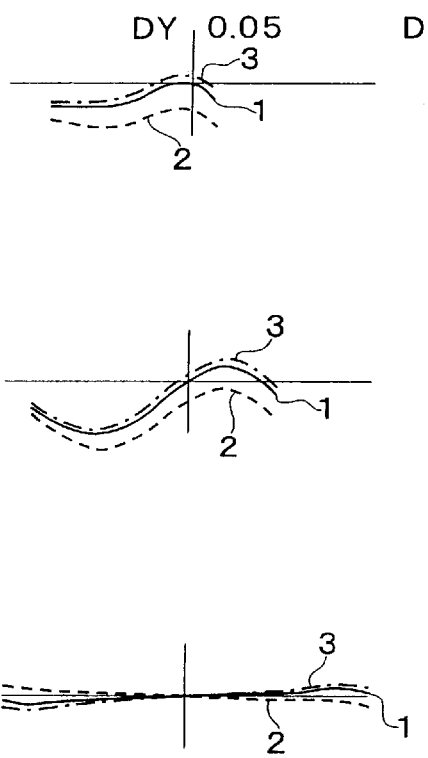
COMA ABERRATION
FIG. 6B
CHROMATIC AND
SPHERICAL ABERRATIONS
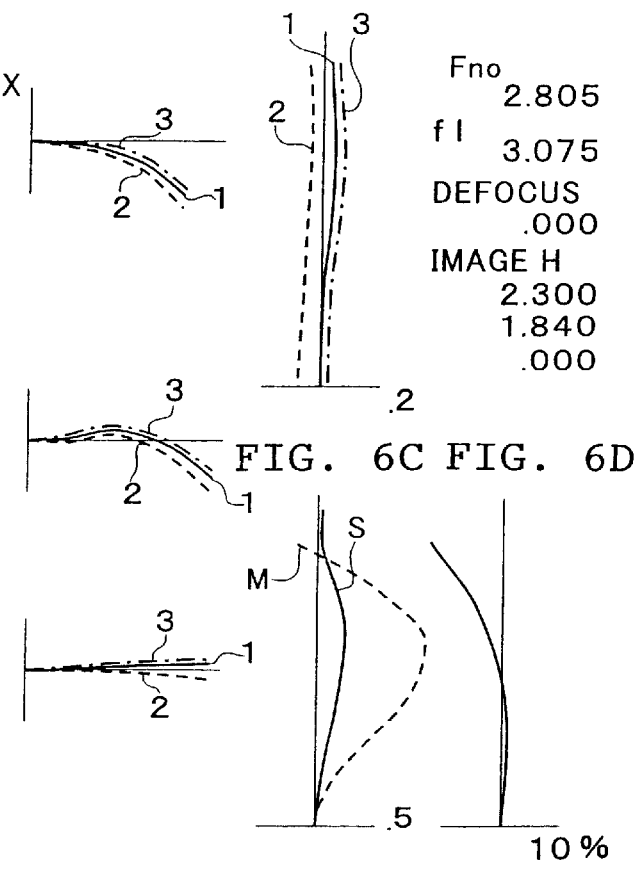
FIG. 6C  FIG. 6D
ASTIGMATISM   DISTORTION
              ABERRATION THIRD EMBODIMENT
FIG. 7A
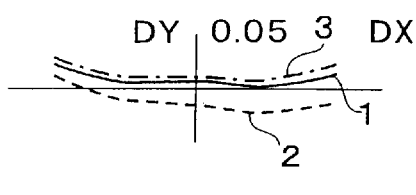
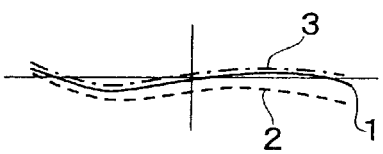
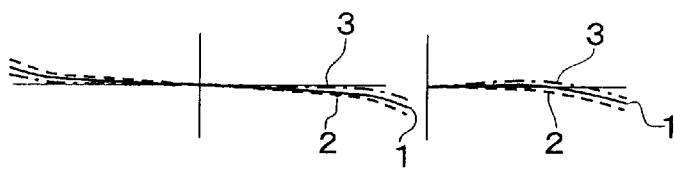
COMA ABERRATION
FIG. 7B
CHROMATIC AND
SPHERICAL ABERRATIONS
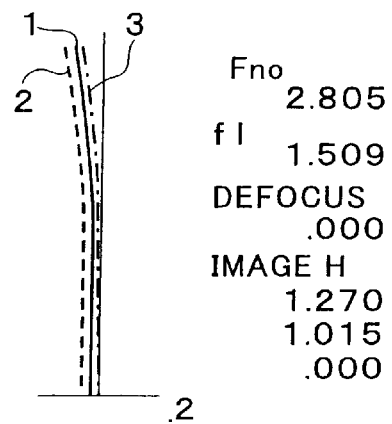
Fno 2.805
f l 1.509
DEFOCUS .000
IMAGE H
1.270
1.015
.000
FIG. 7C  FIG. 7D
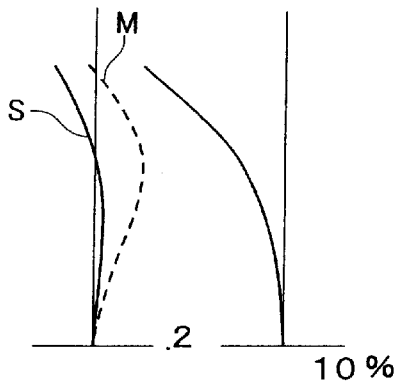
ASTIGMATISM  DISTORTION ABERRATION

IMAGE PICKUP LENS SYSTEM

BACKGROUND OF THE INVENTION

1. Field of the Invention

The present invention relates to an image pickup lens system, and particularly to an image pickup lens system assuming a 1-group 1-lens configuration; i.e., involving a reduced number of lenses, and providing good performance for use with a compact CCD or CMOS serving as an image pickup device.

2. Description of the Related Art

In recent years, since electronic image pickup equipment has been subjected to severe requirements to reduce size, weight, and cost, demand has existed to greatly reduce size and cost in an image pickup lens system.

Particularly, a monitor lens system for use in a cellular phone or a mobile apparatus has been required to have a very short optical length between the image pickup plane and the first surface of a lens. In addition, with an image pickup device becoming compact, the size of an image sensor tends to become small, requiring a lens system to be highly compact.

In order to meet demand for an image pickup lens system of a reduced number of lenses for use with a solid-state image pickup device used in electronic image pickup equipment, a lens system of 2-group 2-lens configuration having relatively good resolution has been proposed. However, the optical length of the proposed lens system is approximately 8 mm, which is still too long for meeting the requirement for reduction in size.

In this connection, a lens system of 1-group 1-lens configuration has also been proposed. The proposed lens system attains the required reduction in size but fails to meet the requirement for reduction in cost due to a large number of components.

With ongoing tendencies toward electronic image pickup equipment becoming increasingly compact, a lens system for use in such equipment must attain further reduction in size, optical length, and cost.

SUMMARY OF THE INVENTION

An object of the present invention is to provide an image pickup lens system for use in electronic image pickup equipment, providing brightness equivalent to an F-number of about 2.8, assuming a 1-group 1-lens configuration, allowing use of a plastic lens, enabling printing on the object-side surface (r1) of a lens (L) so as to serve as an aperture stop (S1), and featuring low cost, compactness, light weight, and high performance.

To achieve the above object, the present invention provides an image pickup lens system configured in the following manner (see FIG. 1).

An image pickup lens system according to a first aspect of the present invention comprises, in sequence from an object side to an image side, an aperture stop (S1), a plano-convex lens (L) having positive power and oriented such that a planar surface of the plano-convex lens (L) faces the object side and a convex surface of the plano-convex lens (L) faces the image side, and a stop (S2). The convex surface of the plano-convex lanes (L) is aspheric.

According to a second aspect of the present invention, in addition to the configurational features of the first aspect, an image pickup lens system is configured so as to satisfy conditions represented by:

$$f = fb \tag{1}$$

$$0.2f < d2 < 1.2f \tag{2}$$

$$v > 30, N > 1.49 \tag{3}$$

where

- f: focal length;
- fb: back focal length;
- d2: thickness of the plano-convex lens;
- v: Abbe number of the plano-convex lens; and
- N: refractive index of the plano-convex lens (at 587.56 nm).

According to a third aspect of the present invention, in addition to the configurational features of the second aspect, the planar surface (r1) on the object side of the plano-convex lens (L) serves as an aperture stop.

The plano-convex lens (L) of the first aspect is made of ordinary glass material or resin. The plano-convex lens (L) contains a resin for cutting near infrared rays but is not made of a special glass material, such as silicon (S1).

The image pickup lens system of the first aspect is intended for application to visible-ray wavelengths but is not intended for application to, for example, infrared wavelengths and a laser-beam wavelength.

The image pickup lens system of the first aspect is intended to provide an image pickup lens system assuming a 1-group 1-lens configuration; i.e., involving a reduced number of lenses, for use in compact electronic image pickup equipment. In order to attain compactness and low cost, the lens system of the first aspect employs the plano-convex lens (L) whose surface on the object side is planar and whose surface on the image side is aspheric for correction of aberration, and the stop (S2) located at the image side of the plano-convex lens (L) and adapted to cut harmful rays.

According to the second aspect, the surface (r1) on the object side of the plano-convex lens (L) is planar. Thus, printing or ink can be applied onto the surface (r1) or Mylar or Somarblack film (PET film) can be affixed onto the surface (r1) such that the planar surface (r1) serves as the aperture stop (S1), thereby decreasing the number of components and thus reducing cost. Somarblack film is black color polyester film in which carbon black is mixed.

Since the surface (r1) on the object side of the plano-convex lens (L) is planar, even when the thickness of the plano-convex lens (L) varies excessively, the focal length f and the back focal length fb remain unchanged. Also, even when the thickness of the plano-convex lens (L) varies to some extent, aberration is not worsened and resolution is not impaired. Thus, mold-manufacturing cost, molding cost, inspection cost, and assembly cost become lower, thereby achieving low production cost.

Condition (1) in the second aspect is attained through employment of the plano-convex lens (L) whose surface (r1) on the object side is planar. As a result of the relationship focal length f=back focal length fb, the focal length f can be measured merely through measurement of the back focal length fb by means of, for example, a collimator. By contrast to the conventional practice in which the focal length f and the back focal length fb are measured discretely for inspection; i.e., measurement is conducted twice for inspection, the present invention enables inspection through a single measurement.

As compared with measurement of the focal length f, measurement of the back focal length fb is completed within a very short period of time. Thus, the focal length f and the back focal length fb can be inspected in approximately ¼ the conventional inspection time through mere measurement of the back focal length fb.

Condition (2) specifies the thickness d2 of the plano-convex lens (L). When the lens thickness d2 is not greater than the lower limit of Condition (2), coma increases and exit pupil distance becomes short, which is undesirable. In the case of a lens whose focal length f is short, an edge dimension of the lens becomes too small, causing a failure to inject resin into a corresponding portion of a mold cavity during injection molding.

When the lens thickness d2 exceeds the upper limit of Condition (2), the overall length and the outer diameter of the lens system become excessively large, thus failing to attain compactness.

Next will be described lens material for realizing the configurational features described above.

In contrast to a lens used only with infrared wavelengths, a lens used only with a laser-beam wavelength, and a lens of an optical system using a single wavelength, the lens of the present invention is used for visible-ray wavelengths and therefore requires correction for chromatic aberration.

When a plurality of lenses are employed, chromatic aberration can be corrected through combination of lenses of low-refractive-index low-dispersion materials and high-refractive-index high-dispersion materials. However, in the case of 1-group 1-lens configuration, there is no choice but to select a single material. Thus, a high-refractive-index low-dispersion material must be selected as lens material. Correction for chromatic aberration becomes difficult unless a high-refractive-index low-dispersion material is used.

Condition (3) is related to glass material. Through use of glass material satisfying Condition (3), contrast, axial chromatic-aberration, and magnification chromatic-aberration can be maintained in good conditions.

The present invention uses the aperture stop (S1) located at the object side of the plano-convex lens (L) and the stop (S2) at the image side of the plano-convex lens (L). The effect of the image-side stop S2 will next be described.

When electronic image pickup equipment employs a CCD or CMOS as an image pickup device, components of excellent planarity, such as a cover glass and a low-pass filter, are interposed between the impale pickup device and a lens system.

A component of excellent planarity causes ghosts and flare for the following reason. Light from an object passes through a lens, a low-pass filter, and a cover glass and then enters an image pickup device. Some rays of the light are reflected by a circumferential portion of the lens and a lens barrel and then enter the image pickup device. Some rays of the light are reflected by the low-pass filter and the cover glass, further reflected by a portion of the lens located radially outside the effective diameter of the lens, and then enter the image pickup device. Such rays cause ghosts and flare. The image-side stop S2 cuts harmful rays and prevents reflection, thereby eliminating ghosts and flare.

Through satisfaction of the above-mentioned conditions and employment of the above-mentioned configuration, the image pickup lens system of the present invention attains compactness, low cost, and excellent characteristics.

As described above, although the image pickup lens system of the present invention assumes a 1-group 1-lens configuration; i.e., includes a reduced number of lenses, the image pickup lens system of the present invention enables use of a plastic lens, attains high compactness, high performance, low cost, and light weight, and is favorably usable with electronic image pickup equipment.

BRIEF DESCRIPTION OF THE DRAWINGS

FIGS. 5A to 5D are diagrams showing aberrations of the image pickup lens according to the first embodiment;

FIGS. 6A to 6D are diagrams showing aberrations of the image pickup lens according to the second embodiment; and FIGS. 7A to 7D are diagrams showing aberrations of the image pickup lens according to the third embodiment.

DESCRIPTION OF THE PREFERRED EMBODIMENTS

Embodiments of the present invention will next be described in detail with reference to the drawings.

Figure 1:
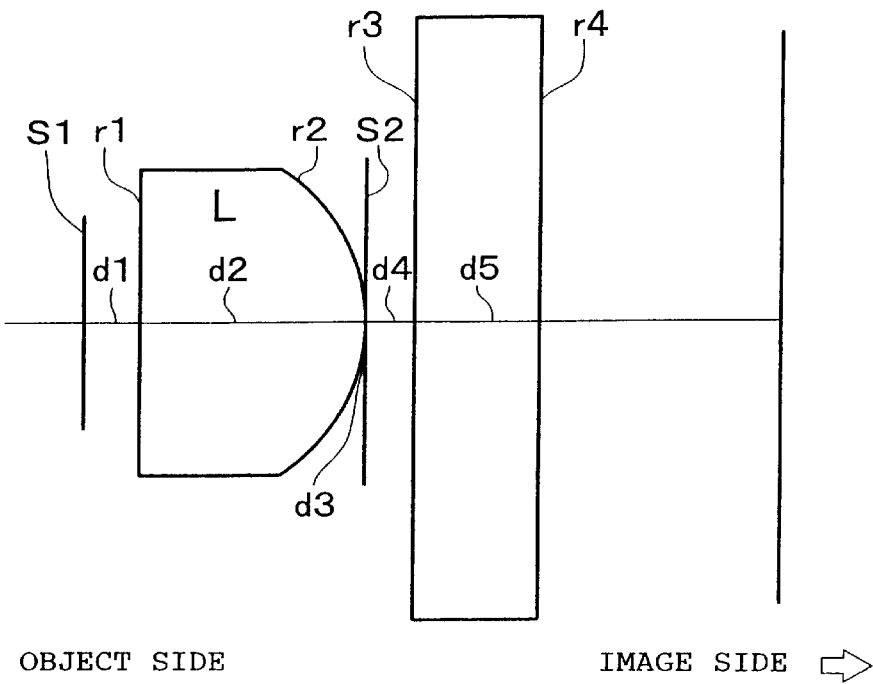
FIG. 1 is a configuration diagram of an image pickup lens system according to the present invention.

FIG. 1 shows the configuration of an image pickup lens system according to the present invention. The image pickup lens system of the present invention includes, in sequence from an object side to an image side and arranged in a row, an aperture stop S1, a plano-convex lens L having positive power and oriented such that the planar surface of the plano-convex lens L faces the object side and the convex surface of the plano-convex lens L faces the image side, and a stop S2. The convex surface of the plano-convex lanes L is aspheric.

Tables 1 to 3 show configuration data regarding first through third embodiments of the present invention.

TABLE 1

| Configuration Data (First Embodiment) | | | |
|---|---|---|---|
| Radius of curvature (ri) | Spacing (di) | Refractive index (N) | Abbe number (ν) |
| S1 = 0.000 | d1 = 0.20 | | |
| r1 = 0.000 | d2 = 1.60 | N 1.53 | ν = 56.0 |
| r2 = −1.430 | d3 = 0.00 | | |
| S2 = 0.000 | d4 = 1.00 | | |
| r3 = 0.000 | d5 = 0.50 | Cover glass | |
| r4 = 0.000 | | | |

| Paraxial Data | |
|---|---|
| Focal length f | = 2.698 mm |
| Fno (Numerical aperture) | = 2.8 |

| Coefficient of Aspheric Surface |
|---|
| r2 K = 0.000 A = 0.160 B = −0.200 C = 0.100 D = 0.000 |

TABLE 2

Configuration Data (Second Embodiment)

| Radius of curvature (ri) | Spacing (di) | Refractive index (N) | Abbe number (ν) |
|---|---|---|---|
| S1 = 0.000 | d1 = 0.20 | | |
| r1 = 0.000 | d2 = 1.60 | N 1.53 | ν = 56.0 |
| r2 = −1.630 | d3 = 0.00 | | |
| S2 = 0.000 | d4 = 1.00 | | |
| r3 = 0.000 | d5 = 0.50 | Cover glass | |
| r4 = 0.000 | | | |

Paraxial Data

| | |
|---|---|
| Focal length f | = 3.075 mm |
| Fno (Numerical aperture) | = 2.8 |

Coefficient of Aspheric Surface r2 K = 0.000 A = 0.900e−1 B = −0.460e−1 C = 0.490e−2 D = 0.000

TABLE 3

Configuration Data (Third Embodiment)

| Radius of curvature (ri) | Spacing (di) | Refractive index (N) | Abbe number (ν) |
|---|---|---|---|
| S1 = 0.000 | d1 = 0.00 | | |
| r1 = 0.000 | d2 = 0.90 | N 1.53 | ν = 56.0 |
| r2 = −0.800 | d3 = 0.00 | | |
| S2 = 0.000 | d4 = 1.00 | | |
| r3 = 0.000 | d5 = 0.50 | Cover glass | |
| r4 = 0.000 | | | |

Paraxial Data

| | |
|---|---|
| Focal length f | = 1.509 mm |
| Fno (Numerical aperture) | = 2.8 |

Coefficient of Aspheric Surface r2 K = 0.000 A = 0.55 B = −0.157e+1 C = 0.243e+1 D = 0.000

Figure 2:
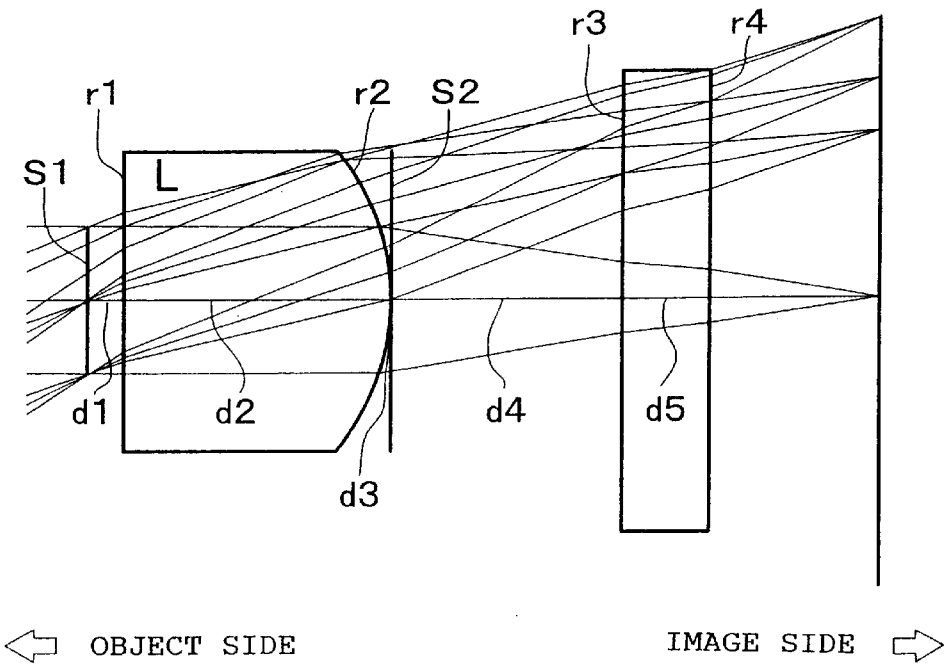
FIG. 2 is a longitudinal sectional view of an image pickup lens system according to a first embodiment of the present invention.
Figure 3:
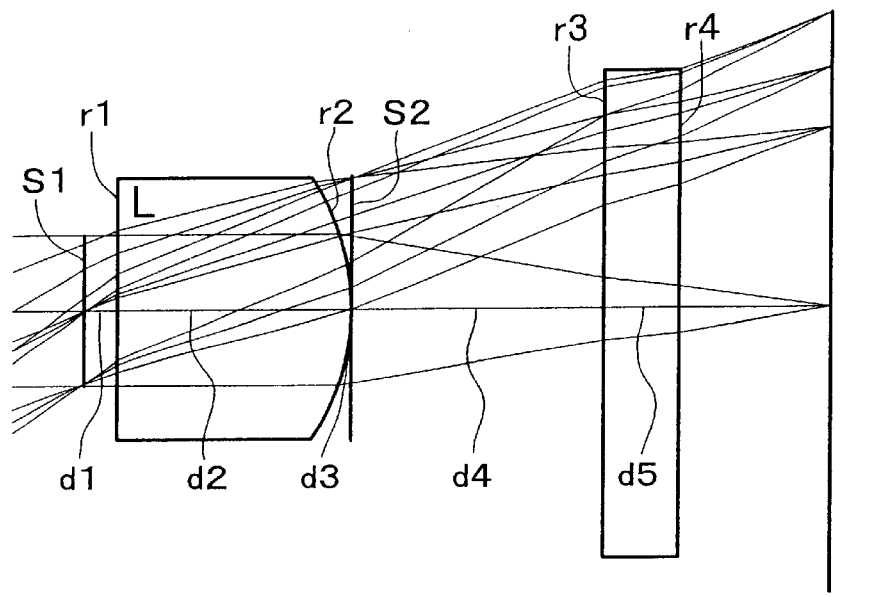
FIG. 3 is a longitudinal sectional view of an image pickup lens system according to a second embodiment of the present invention.
Figure 4:
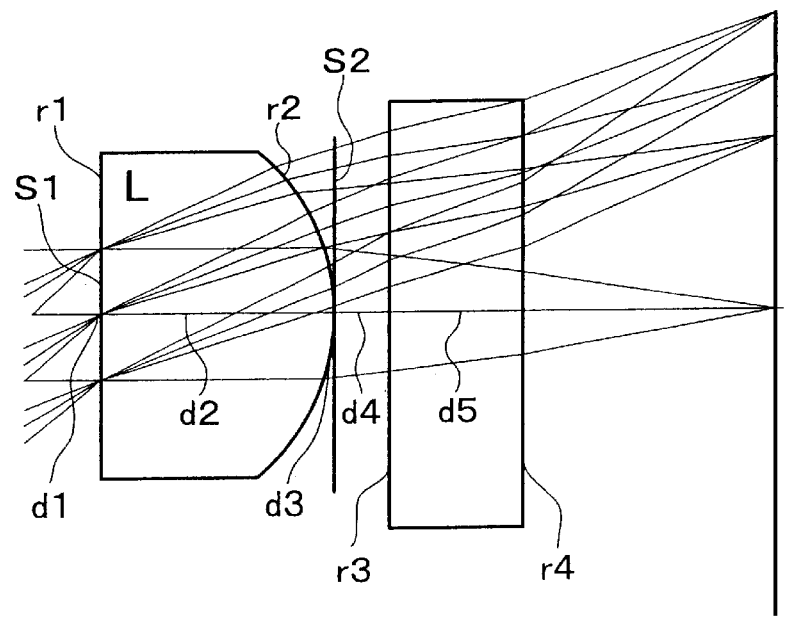
FIG. 4 is a longitudinal sectional view of an image pickup lens system according to a third embodiment of the present invention.

FIGS. 2 to 4 show image pickup lens systems configured in accordance with data shown in Tables 1 to 3. The image pickup lens systems of the first through third embodiments share the basic configuration shown in FIG. 1 and differ in data.

FIGS. 5 to 7 show aberrations of the first through third embodiments.

In the first through third embodiments, surface numbers i are counted from the object side to the image side and denote corresponding surfaces of components, such as lenses. Symbols appearing in FIGS. 1 to 4 and Tables 1 to 3 are defined as follows:

ri: radius of curvature of surface i (as measured on axis for aspheric surface)

di: distance between surface i and surface i+1

N: refractive index of medium present in lens

ν: dispersion of medium present in lens

Data on aspheric surfaces are shown at the bottom of Tables 1 to 3, together with surface numbers. For the aperture stop S1, the object-side surface r1 of the plano-convex lens L, and the stop S2, a radius of curvature of 0 means that the radius of curvature is infinity. Refractive index is measured by use of D rays (587.56 nm), and Abbe number represents dispersion.

In FIGS. 5C and 5D, an end of each of curves representing astigmatic aberration and distortion aberration is located 1.85 mm from the center.

In FIGS. 6C and 6D, an end of each of curves representing astigmatic aberration and distortion aberration is located 2.30 mm from the center.

In FIGS. 7C and 7D, an end of each of curves representing astigmatic aberration and distortion aberration is located 1.27 mm from the center.

In FIGS. 5A, 5B, 6A, 6B, 7A, and 7B, numerals 1, 2, and 3 correspond to wavelengths of 587.56 nm, 435.84 nm, and 656.27 nm, respectively.

An aspheric surface used in the present invention is represented by the following expression.

$$Z = ch^2/[1 + \{1-(1+k)c^2h^2\}^{+\frac{1}{2}}] + Ah^4 + Bh^6 + Ch^8 + Dh^{10} \quad \text{Expression 1}$$

where

Z: depth from tangent plane with respect to vertex of surface;

c: paraxial radius of curvature of surface;

h: height above optical axis;

k: cone constant;

A: fourth-degree aspheric surface coefficient;

B: sixth-degree aspheric surface coefficient;

C: eighth-degree aspheric surface coefficient; and

D: tenth-degree aspheric surface coefficient.

In Tables 1 to 3, an appendix; for example, "e−1," to a value indicative of an aspheric surface coefficient denotes 10 to the power of −1.

Features of the first through third embodiments are described below.

A lens system of the first embodiment configured as represented by configuration data shown in Table 1 and as shown in FIG. 2 has the following features: the lens (L) is made of ZEONEX, a heat resistant resin; the lens (L) has a planar surface on the object side and an aspheric surface on the image side;

| | |
|---|---|
| focal length of lens (L) | f = 2.698 mm; |
| back focal length of lens (L) | fb = 2.698 mm; |
| thickness of lens (L) | d2 = 1.60 mm; |
| refractive index of lens (L) | N = 1.53; |
| Abbe number of lens (L) | ν = 56.0; |
| f = fb | 2.698 = 2.698; |
| 0.2 f < d2 < 1.2 f | 0.5396 < 1.6 < 3.2376; and |
| ν > 30, N > 1.49 | 56.0 > 30, 1.53 > 1.49. |

A lens system of the second embodiment configured as represented by configuration data shown in Table 2 and as shown in FIG. 3 has the following features: the lens (L) is made of ZEONEX, a heat resistant resin; the lens (L) has a planar surface on the object side and an aspheric surface on the image side;

| | |
|---|---|
| focal length of lens (L) | f = 3.075 mm; |
| back focal length of lens (L) | fb = 3.075 mm; |
| thickness of lens (L) | d2 = 1.60 mm; |
| refractive index of lens (L) | N = 1.53; |
| Abbe number of lens (L) | ν = 56.0; |
| f = fb | 3.075 = 3.075; |
| 0.2 f < d2 < 1.2 f | 0.615 < 1.6 < 3.69; and |
| ν > 30, N > 1.49 | 56.0 > 30, 1.53 > 1.49. |

A lens system of the third embodiment configured as represented by configuration data shown in Table 3 and as shown in FIG. 4 has the following features: the lens (L) is made of ZEONEX, a heat resistant resin; the lens (L) has a planar surface on the object side and an aspheric surface on the image side; the object-side planar surface (r1) of the lens (L) serves as the aperture stop S1;

| | |
|---|---|
| focal length of lens (L) | f = 1.509 mm; |
| back focal length of lens (L) | fb = 1.509 mm; |
| thickness of lens (L) | d2 = 0.90 mm; |
| refractive index of lens (L) | N = 1.53; |
| Abbe number of lens (L) | ν =56.0; |
| f = fb | 1.509 = 1.509; |
| 0.2 f < d2 < 1.2 f | 0.3018 < 0.9 < 1.8108; and |
| ν > 30, N > 1.49 | 56.0 > 30, 1.53 > 1.49. |

What is claimed is:

1. An image pickup lens system comprising, in sequence from an object side to an image side:

an aperture stop;

a plano-convex lens having positive power and oriented such that a planar surface of said plano-convex lens faces the object side and a convex surface of said plano-convex lens faces the image side, the convex surface being aspheric; and a stop.

2. An image pickup lens system according to claim 1, configured so as to satisfy conditions represented by:

f=fb;

0.2f<d2<1.2f; and

ν>30, N>1.49;

where f: focal length;

fb: back focal length;

d2: thickness of said plano-convex lens;

ν: Abbe number of said plano-convex lens; and

N: refractive index of said plano-convex lens (at 587.56 nm).

3. An image pickup lens system according to claim 2, wherein the planar surface on the object side of said plano-convex lens serves as an aperture stop.

4. An image pickup lens system according to claim 1, wherein said plano-convex lens is made of plastic.

5. An image pickup lens system according to claim 3, wherein printing is formed on the planar surface on the object side of said plano-convex lens such that the planar surface serves as an aperture stop.

6. An image pickup lens system according to claim 3, wherein ink is applied onto the planar surface on the object side of said plano-convex lens such that the planar surface serves as an aperture stop.

7. An image pickup lens system according to claim 3, wherein Mylar is affixed onto the planar surface on the object side of said plano-convex lens such that the planar surface serves as an aperture stop.

8. An image pickup lens system according to claim 3, wherein Somarblack film is affixed onto the planar surface on the object side of said plano-convex lens such that the planar surface serves as an aperture stop.

\* \* \* \* \*